(12) United States Patent
Hoshina et al.

(10) Patent No.: US 8,895,191 B2
(45) Date of Patent: Nov. 25, 2014

(54) NONAQUEOUS ELECTROLYTE BATTERY AND BATTERY PACK

(71) Applicants: Keigo Hoshina, Yokohama (JP); Hiroki Inagaki, Yokohama (JP); Norio Takami, Yokohama (JP)

(72) Inventors: Keigo Hoshina, Yokohama (JP); Hiroki Inagaki, Yokohama (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 104 days.

(21) Appl. No.: 13/727,833

(22) Filed: Dec. 27, 2012

(65) Prior Publication Data

US 2013/0252076 A1    Sep. 26, 2013

(30) Foreign Application Priority Data

Mar. 23, 2012  (JP) ................................ 2012-068275

(51) Int. Cl.
| | |
|---|---|
| *H01M 4/50* | (2010.01) |
| *H01M 4/58* | (2010.01) |
| *H01M 4/525* | (2010.01) |
| *H01M 4/505* | (2010.01) |
| *H01M 4/485* | (2010.01) |
| *H01M 4/48* | (2010.01) |
| *H01M 10/42* | (2006.01) |
| *H01M 10/0525* | (2010.01) |
| *H01M 4/36* | (2006.01) |

(52) U.S. Cl.
CPC ............ *H01M 4/505* (2013.01); *Y02T 10/7011* (2013.01); *H01M 4/483* (2013.01); *Y02E 60/122* (2013.01); *H01M 4/525* (2013.01); *H01M 2010/4292* (2013.01); *H01M 10/0525* (2013.01); *H01M 4/485* (2013.01); *H01M 4/364* (2013.01)
USPC ....... 429/231.95; 429/163; 429/211; 429/224

(58) Field of Classification Search
CPC  Y02E 60/122; H01M 10/0525; H01M 4/505; H01M 10/052; H01M 4/131; H01M 4/525; H01M 4/485; H01M 2010/4292; H01M 4/364; H01M 4/483; Y02T 10/7011
USPC ............................ 429/163, 211, 224, 231.95
See application file for complete search history.

(56) References Cited

U.S. PATENT DOCUMENTS

| | | | |
|---|---|---|---|
| 8,431,273 B2 * | 4/2013 | Saruwatari et al. | 429/231.95 |
| 2006/0204851 A1 * | 9/2006 | Lee et al. | 429/231.3 |
| 2009/0169997 A1 * | 7/2009 | Saruwatari et al. | 429/221 |
| 2013/0122348 A1 * | 5/2013 | Ishibashi et al. | 429/156 |
| 2013/0209863 A1 * | 8/2013 | Harada et al. | 429/163 |

FOREIGN PATENT DOCUMENTS

JP          10-69922       3/1998

OTHER PUBLICATIONS

Office Action issued Sep. 24, 2014 in Japan Patent Application No. 2012-068275 with English Translation.

* cited by examiner

*Primary Examiner* — Stewart Fraser
(74) *Attorney, Agent, or Firm* — Oblon, Spivak, McClelland, Maier & Neustadt, L.L.P.

(57) ABSTRACT

According to one embodiment, a nonaqueous electrolyte battery is provided. A positive electrode contains a lithium-nickel-cobalt-manganese complex oxide represented by the formula $Li_{1+a}Ni_{1-b-c}Co_bMn_cO_2$. A negative electrode contains at least one selected from a lithium titanate having a spinel structure and a monoclinic β-type titanium complex oxide. The negative electrode further contains at least one selected from an oxide which has a spinel structure and represented by the formula $AFe_2O_4$ and an oxide which has a spinel structure and represented by the formula $ACo_2O_4$. A ratio of the total mass of $AFe_2O_4$ and $ACo_2O_4$ to the total mass of the negative electrode active material is in a range from 1% by mass to 5% by mass.

20 Claims, 3 Drawing Sheets

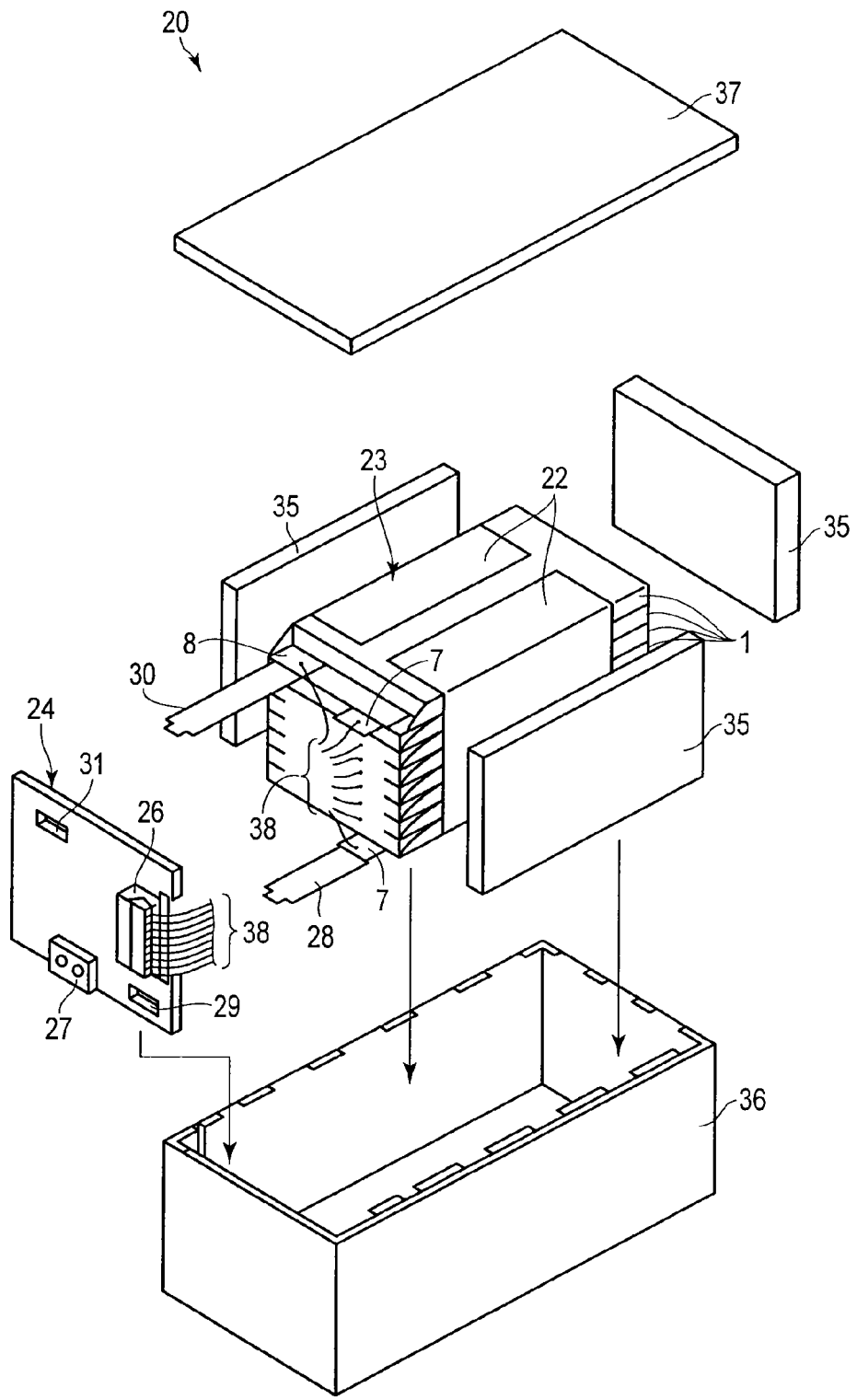
F I G. 3

NONAQUEOUS ELECTROLYTE BATTERY AND BATTERY PACK

CROSS-REFERENCE TO RELATED APPLICATIONS

This application is based upon and claims the benefit of priority from Japanese Patent Application No. 2012-068275, filed Mar. 23, 2012, the entire contents of which are incorporated herein by reference.

FIELD

Embodiments described herein relate generally to a nonaqueous electrolyte battery and a battery pack.

BACKGROUND

Nonaqueous electrolyte battery is attracting great attention as medium-sized or large-sized power source for hybrid car or electric car. Such an application demands long life and high safety of the nonaqueous electrolyte battery.

As the positive electrode active material used in the nonaqueous electrolyte battery, lithium-transition metal complex oxide containing Co, Mn, or Ni, lithium-transition metal complex oxide having a layer structure such as lithium cobaltate, and lithium-transition metal oxide having a spinel structure such as lithium manganate have been developed.

As the negative electrode active material used in the nonaqueous electrolyte battery, a carbonaceous material is generally used. Recently, however, materials in which insertion and release of lithium ions occur at higher potentials have been developed. Among the materials, a lithium titanate and a titanium complex oxide which have a spinel structure are expected to have high safety.

BRIEF DESCRIPTION OF THE DRAWINGS

FIG. 3 is an exploded perspective view of a battery pack according to a second embodiment.

DETAILED DESCRIPTION

According to one embodiment, a nonaqueous electrolyte battery is provided. The nonaqueous electrolyte battery includes a positive electrode, a negative electrode, and a nonaqueous electrolyte. The positive electrode includes a positive electrode current collector and a positive electrode layer provided on the positive electrode current collector. The negative electrode includes a negative electrode current collector and a negative electrode layer provided on the negative electrode current collector. The positive electrode layer contains a positive electrode active material. The positive electrode active material contains a lithium-nickel-cobalt-manganese complex oxide represented by the formula $Li_{1+a}Ni_{1-b-c}Co_bMn_cO_2$, where a, b, and c satisfy a relationship represented by a inequality $0 \leq a \leq 0.2$, $0 < b \leq 0.4$, and $0 < c \leq 0.4$, respectively. The negative electrode layer contains a negative electrode active material. The negative electrode active material contains at least one selected from a lithium titanate having a spinel structure and a monoclinic β-type titanium complex oxide. The negative electrode active material further contains at least one selected from a oxide which has a spinel structure and represented by the formula $AFe_2O_4$ and a oxide which has a spinel structure and represented by the formula $ACo_2O_4$. In the formulae, A is at least one element selected from the group consisting of Cu, Co, Ca, Mg, Zn, Ni, and Fe. The ratio of the total mass of the oxide represented by the formula $AFe_2O_4$ and the oxide represented by the formula $ACo_2O_4$ to the total mass of the negative electrode active material is in a range from 1% by mass to 5% by mass. A capacity of the negative electrode is larger than that of the positive electrode.

Embodiments will be each explained with reference to the drawings. A structure common to these embodiments is designated by the same sign and duplicated explanations will be omitted. Further, each drawing is a typical view for explaining the embodiment and for promoting the understanding of the embodiment. Though there are parts different from an actual device in shape, dimension and ratio, these structural designs may be properly changed taking the following explanations and known technologies into consideration.

(First Embodiment)

Figure 1:
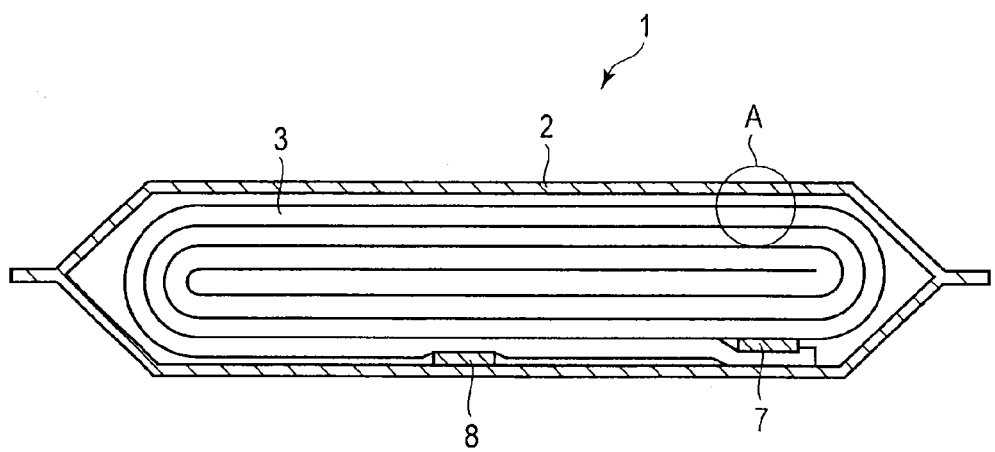
FIG. 1 is a sectional view of a nonaqueous electrolyte battery according to a first embodiment.
Figure 2:
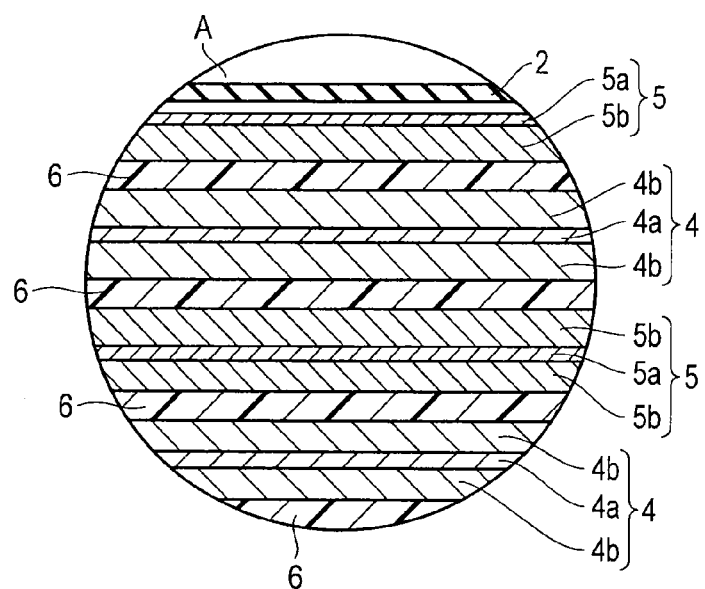
FIG. 2 is an enlarged sectional view of the part A in FIG. 1.

A nonaqueous electrolyte battery according to a first embodiment will be explained with reference to the drawings. FIG. 1 is a typical sectional view of a flat-type nonaqueous electrolyte secondary battery which is an example of the nonaqueous electrolyte battery. FIG. 2 is an enlarged sectional view of the part A shown in FIG. 1.

A battery 1 is provided with a container 2 and an electrode group 3 accommodated in the container 2. Here, a coil electrode group is used as the electrode group 3. The container 2 has a baggy form. A nonaqueous electrolyte (not shown) is contained inside of the container 2.

The electrode group 3, as shown in FIG. 2, includes a positive electrode 4, a negative electrode 5, and a plurality of separators 6. The electrode group 3 has a structure in which a laminate is spirally coiled. This laminate has, though not limited to, a structure in which a separator 6, a positive electrode 4, another separator 6 and a negative electrode 5 are stuck in this order. A flat-type coil electrode group is manufactured by spirally coiling the laminate in such a manner that the negative electrode is located on the outermost periphery and by pressing while heating.

The positive electrode 4 includes a positive electrode current collector 4a and a positive electrode layer 4b. The positive electrode layer 4b is provided on both surfaces of the positive electrode current collector 4a. The positive electrode layer 4b includes a positive electrode active material and optionally, a conductive agent and a binder.

The positive electrode active material contains a lithium-nickel-cobalt-manganese complex oxide represented by the formula $Li_{1+a}Ni_{1-b-c}Co_bMn_cO_2$. A complex oxide like this has a layer structure and has the advantage that it has a large capacity. In the formula, a, b, and c satisfy a relationship represented by a inequality $0 \leq a \leq 0.2$, $0 < b \leq 0.4$, and $0 < c \leq 0.4$, respectively. When $\underline{a}$ is 0 or more, charge-discharge performance is improved. When $\underline{a}$ is 0.2 or less, impurities are reduced. When the amount of Ni contained in the above complex oxide is increased, this causes increase in reversible discharge capacity. Therefore, each of $\underline{b}$ and $\underline{c}$ is preferably 0.4 or less and more preferably 0.2 or less. Each of $\underline{b}$ and $\underline{c}$ is preferably more than 0 to stabilize the crystal structure of the lithium-nickel-cobalt-manganese complex oxide and preferably 0.2 or less to obtain a high reversible capacity.

The lithium-nickel-cobalt-manganese complex oxide may be singly used as the positive electrode active material. Alternatively, the positive electrode active material may further contain one or more other oxide.

Examples of other oxide include those into which lithium ion can be inserted, for example, manganese dioxide ($MnO_2$), iron oxide, copper oxide, nickel oxide, lithium-manganese complex oxide (for example, $Li_xMn_2O_4$ or $Li_xMnO_2$), lithium-nickel complex oxide (for example, $Li_xNiO_2$), lithium-cobalt complex oxide (for example, $Li_xCoO_2$), lithium-nickel-cobalt complex oxide (for example, $LiNi_{1-y}Co_yO_2$), lithium-manganese-cobalt complex oxide (for example, $Li_xMn_yCo_{1-y}O_2$), lithium-nickel-cobalt-aluminum complex oxide (for example, $LiNi_{1-y-z}Co_yAl_zO_2$), lithium-manganese-nickel complex oxide having a spinel structure (for example, $Li_xMn_{2-y}Ni_yO_4$), lithium-phosphorous oxide having an olivine structure (for example, $Li_xFePO_4$ or $Li_xFe_{1-y}Mn_yPO_4$), iron sulfate (for example, $Fe_2(SO_4)_3$), and vanadium oxide (for example, $V_2O_5$). In the above formulae, x, y, and z preferably satisfy the relationship represented by an inequality $0<x\le1$, $0<y\le1$, and $0\le z\le1$, respectively.

More preferable examples of other oxide include lithium-manganese complex oxide (for example, $Li_xMn_2O_4$ or $Li_xMnO_2$), lithium-aluminum-manganese complex oxide (for example, $Li_xAl_yMn_{2-y}O_4$), lithium-cobalt complex oxide (for example, $Li_xCoO_2$), lithium-nickel-cobalt complex oxide (for example, $Li_xNi_{1-y}Co_yO_2$), lithium-manganese-cobalt complex oxide (for example, $Li_xMn_yCo_{1-y}O_2$), and lithium iron phosphate (for example, $Li_xFePO_4$). In the above formulae, x, y, and z satisfy the relationship represented by an inequality $0<x\le1$, $0\le y\le1$, and $0\le z\le1$, respectively.

Typically, the above other oxide is lithium-manganese complex oxide having a spinel structure (for example, $Li_xMn_2O_4$ or $Li_xMnO_2$). The complex oxide has the advantage that they have high safety and good cycle performance.

The ratio of mass of the lithium-nickel-cobalt-manganese complex oxide to the total mass of the positive electrode active material is preferably equal to or more than 50% by mass.

The conductive agent is used to improve the current collective performance and to reduce the contact resistance between the active material and the positive electrode current collector 4a. Examples of the conductive agent include carbon materials such as acetylene black, carbon black, graphite, carbon nanofiber, or carbon nanotube.

The binder is used to bind the active material, conductive agent, and positive electrode current collector 4a. Examples of the binder include polytetrafluoroethylene (PTFE), polyvinylidene fluoride (PVdF), and fluoro-rubber.

The proportion of contents of the active material, conductive agent, and binder in the positive electrode layer 4b are preferably 80% by mass to 95% by mass, 3% by mass to 18% by mass, and 2% by mass to 17% by mass, respectively.

When the content of the conductive agent is 3% by mass or more, the aforementioned effect can be produced. When the content of the conductive agent is 18% by mass or less, the decomposition of the nonaqueous electrolyte on the surface of the conductive agent can be reduced when the battery is stored at high temperatures.

When the content of the binder is 2% by mass or more, sufficient strength of the positive electrode can be obtained. When the content of the binder is 17% by mass or less, the formulating amount of the binder which is an insulating material can be reduced, making possible to reduce internal resistance.

The positive electrode current collector 4a is preferably made of an aluminum foil or an aluminum alloy foil containing at least one element selected from the group consisting of Mg, Ti, Zn, Mn, Fe, Cu, and Si.

The positive electrode can be manufactured by the following method. First, a positive electrode active material, conductive agent, and binder are suspended in a proper solvent to prepare slurry. This slurry is applied to one or both surfaces of a positive electrode current collector and dried to form a positive electrode active material layer. Then, the positive electrode active material layer is subjected to pressing. Alternatively, the positive electrode active material, conductive agent, and binder are made into a pellet, which may be used as a positive electrode active material layer.

The negative electrode 5 includes a negative electrode current collector 5a and a negative electrode layer 5b. The negative electrode layer 5b is provided on both surfaces of the negative electrode current collector 5a. In the part positioned at the outermost side of the electrode group 3, however, the negative electrode layer 5b is provided only on the inner side of the negative electrode current collector 5a, as shown in FIG. 2. The negative electrode layer 5b includes a negative electrode active material, and optionally, a conductive agent and a binder.

The negative electrode active material contains at least one selected from a lithium titanate having a spinel structure (for example, $Li_4Ti_5O_{12}$) and a monoclinic β-type titanium complex oxide. Hereinafter, the lithium titanate having a spinel structure is called "LTO". The monoclinic β-type titanium complex oxide means titanium complex oxide having a crystal structure of monoclinic titanium dioxide. The crystal structure of monoclinic titanium dioxide primarily belongs to a space group C2/m. Hereinafter monoclinic β-type titanium complex oxide is called "$TiO_2(B)$".

The negative electrode active material further contains at least one selected from a oxide which has a spinel structure and represented by the formula $AFe_2O_4$ and a oxide which has a spinel structure and represented by the formula $ACo_2O_4$. In the formulae, A is at least one element selected from the group consisting of Cu, Co, Ca, Mg, Zn, Ni, and Fe. The ratio of the total mass of the oxide represented by the formula $AFe_2O_4$ and the oxide represented by the formula $ACo_2O_4$ to the total mass of the negative electrode active material is in a range of 1% by mass to 5% by mass. When the negative electrode contains such a negative electrode active material, the voltage drop of the negative electrode in the end period of charge step can be suppressed. The decomposition of the electrolyte solution can be thereby limited. As a result, a rise in resistance can be limited.

Examples of the oxide represented by the formula $AFe_2O_4$ include $Fe_3O_4$ and $ZnFe_2O_4$. The oxide represented by the formula $AFe_2O_4$ is typically $Fe_3O_4$.

Examples of the oxide represented by the formula $ACo_2O_4$ include $Co_3O_4$, $ZnCo_2O_4$, $CuCo_2O_4$, and $NiCo_2O_4$.

The negative electrode active material may contain any one of LTO and $TiO_2(B)$ or may contain the both. LTO has excellent large-current property. Therefore, LTO may be contained singly in order to produce a battery having excellent large-current performance. In contrast, $TiO_2(B)$ has a high theoretical capacity (about 335 mAh/g). Therefore, $TiO_2(B)$ may be contained singly in order to produce a battery having a high energy density. When LTO and $TiO_2(B)$ are both contained in the negative electrode active material, LTO and $TiO_2(B)$ may be formulated in an optional ratio.

The negative electrode active material may further contain other oxide. The other oxide is preferably one in which insertion and release of lithium ions occur at the potential closer to those of LTO and $TiO_2(B)$. Examples of the other oxide include lithium-titanium oxide having a rhamsdellite structure (for example, $Li_2Ti_3O_7$), titanium oxide having an anatase structure (for example, $TiO_2$), and niobium complex oxide (for example, $Nb_2O_5$ or $TiNb_2O_7$).

The ratio of the total mass of LTO, $TiO_2(B)$, $AFe_2O_4$ and $ACo_2O_4$ to the total mass of the negative electrode active material is preferably equal to or more than 50% by mass.

The conductive agent is used to improve the current collecting performance and to reduce the contact resistance between the active material and the negative electrode current collector 5a. Examples of the conductive agent include carbon materials such as acetylene black, carbon black, or graphite.

The binder is used to bind the active material, conductive agent, and negative electrode current collector 5a. Examples of the binder include polytetrafluoroethylene (PTFE), polyvinylidene fluoride (PVdF), fluoro-rubber, and styrene-butadiene rubber.

The proportion of contents of the active material, conductive agent, and binder in the negative electrode layer 5b are preferably 70% by mass to 96% by mass, 2% by mass to 28% by mass, and 2% by mass to 28% by mass, respectively. When the content of the conductive agent is 2% by mass or more, the current collecting performance of the negativeelectrode layer can be improved. Further, when the content of the binder is 2% by mass or more, the binding ability between the negative electrode layer and the current collector can be sufficiently obtained. For this, the cycle performance can be improved. In contrast, the both contents of the conductive agent and binder are preferably 28% by mass or less.

The negative electrode current collector 5a is preferably made of a material which is electrochemically stable in a potential range higher than 1.0 V. Examples of such a material include an aluminum foil, or an aluminum alloy foil containing at least one element selected from the group consisting of Mg, Ti, Zn, Mn, Fe, Cu, and Si.

The negative electrode can be manufactured by the following method. First, a negative electrode active material, conductive agent, and binder are suspended in a proper solvent to prepare slurry. This slurry is applied to one or both surfaces of a negative electrode current collector and dried to form a negative electrode active material layer. Then, the negative electrode active material layer is subjected to pressing. Alternatively, the negative electrode active material, conductive agent, and binder are made into a pellet, which may be used as a negative electrode active material layer.

As the separator, a porous film made from materials such as polyethylene, polypropylene, cellulose or polyvinylidene fluoride (PVdF), a synthetic resin nonwoven fabric or the like can be used. A porous film made of polyethylene or polypropylene melts at a certain temperature and can block electric current, and thus it is preferred from the viewpoint of improvement in safety.

As the nonaqueous electrolyte, a liquid nonaqueous electrolyte or gel-like nonaqueous electrolyte may be used. The liquid nonaqueous electrolyte is prepared by dissolving an electrolyte in an organic solvent. The gel-like nonaqueous electrolyte is prepared by forming a complex of the liquid electrolyte and polymer material.

The concentration of the electrolyte in the liquid nonaqueous electrolyte is preferably in the range of 0.5 mol/l to 2.5 mol/l.

Examples of the electrolyte include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethasulfonate ($LiCF_3SO_3$), or bistrifluoromethylsulfonylimide lithium [$LiN(CF_3SO_2)_2$], or mixtures of these compounds. The electrolyte is preferably one which is scarcely oxidized at a high potential and $LiPF_6$ is most preferable.

Examples of the organic solvent include cyclic carbonates such as propylene carbonate (PC), ethylene carbonate (EC), or vinylene carbonate; chain carbonates such as diethyl carbonate (DEC), dimethyl carbonate (DMC) or methylethyl carbonate (MEC); cyclic ethers such as tetrahydrofuran (THF), 2-methyltetrahydrofuran (2MeTHF) or dioxolan (DOX); chain ethers such as dimethoxyethane (DME) or diethoxyethane (DEE); γ-butyrolactone (GBL), acetonitrile (AN) and sulfolan (SL). These organic solvents may be used either singly or in combinations of two or more.

More preferable examples of the organic solvent include mixture solvents of a cyclic carbonate and chain carbonate selected from the group consisting of propylene carbonate (PC), ethylene carbonate (EC) and diethyl carbonate (DEC), dimethyl carbonate (DMC), and methylethyl carbonate (MEC), and mixture solvents of γ-butyrolactone (GBL) and other solvents.

Examples of the polymer material include a polyvinylidene fluoride (PVdF), polyacrylonitrile (PAN), and polyethylene oxide (PEO).

As the container, a container made of a laminate film or a metal container may be used.

Examples of the shape of the container include a flat type, angular type, cylinder type, coin type, button type, sheet type, and laminate type. The shape and size of the container is arbitrarily designed according to the size of a battery. For example, container for miniature battery to be mounted in mobile electronic devices or container for large battery to be mounted on two- or four-wheel vehicles may be used.

As the laminate film, a multilayer film prepared by interposing a metal layer between resin layers may be used. The metal layer is preferably formed of an aluminum foil or aluminum alloy foil to reduce the weight of the battery. The resin layer reinforces the metal layer. The resin layer may be made of a polymer such as a polypropylene (PP), polyethylene (PE), nylon, or polyethylene terephthalate (PET). The thickness of the laminate film forming the container 2 is preferably 0.5 mm or less and more preferably 0.2 mm or less. The laminate film can be molded into a desired form by heat sealing.

The metal container may be formed of aluminum, an aluminum alloy, or the like. The aluminum alloy preferably contains element such as Mg, Zn, or Si. In the case where a transition metal such as Fe, Cu, Ni, or Cr is contained in the alloy, the content of these transition metals is preferably 1% by mass or less. The thickness of the metal plate used to form the metal container is preferably 1 mm or less, more preferably 0.5 mm or less, and even more preferably 0.2 mm or less.

As shown in FIG. 1, a positive electrode terminal 7 is connected with a positive electrode current collector 4a in the vicinity of the outside peripheral end of an electrode group 3. Further, a negative electrode terminal 8 is connected with the negative electrode current collector 5a on the outermost periphery of the electrode group 3. The positive electrode terminal 7 and negative electrode terminal 8 are extended to outside through an opening of the container 2.

The positive electrode terminal 7 is made of a material which has electroconductivity and is electrically stable in a potential range of 3.0 V to 4.5 V relative to metallic lithium. Hereinafter, the potential relative to metallic lithium is referred to as "V (vs. Li/Li$^+$)". The positive electrode terminal 7 is preferably made of aluminum or an aluminum alloy containing at least one element selected from Mg, Ti, Zn, Mn, Fe, Cu, or Si. The positive electrode terminal 7 is preferably made of the same material as the positive electrode current collector 4*a* to reduce the contact resistance with the positive electrode current collector 4*a*.

The negative electrode terminal 8 is made of a material which has electroconductivity and is electrically stable in a potential range of 1.0 V to 3.0 V (vs. Li/Li$^+$). Examples of such a material include aluminum or an aluminum alloy containing at least one element selected from Mg, Ti, Zn, Mn, Fe, Cu, or Si. The negative electrode terminal 8 is preferably made of the same material as the negative electrode current collector 5*a* to reduce the contact resistance with the negative electrode current collector 5*a*.

The nonaqueous electrolyte battery is manufactured in the following manner. First, the electrode group 3 is accommodated in the container 2 and then, a nonaqueous electrolyte is injected from an opening of the container 2. Then, the electrode group 3 is impregnated with the nonaqueous electrolyte. After that, the opening of the container 2 is heat-sealed with the positive electrode terminal 7 and negative electrode terminal 8 being inserted therein to seal the electrode group 3 and nonaqueous electrolyte.

In the embodiment, the electrode group 3 is so designed that the capacity of the negative electrode is larger than the capacity of the positive electrode. Here, the capacities of the positive electrode and negative electrode respectively mean a chargeable capacity of each electrode at ambient temperature and charge current corresponding to the standard condition used when a battery using these positive and negative electrodes is used as a power source. In the embodiment, therefore, the following relation is established: the capacity of the positive electrode is almost equal to that of a chargeable capacity of a battery and the capacity of the negative electrode is larger than the chargeable capacity of the battery. Because these capacities are slightly different depending on measuring condition, the capacities of the positive and negative electrodes defined in the embodiment are determined according to the values measured in the following condition.

A) Capacity of the Positive Electrode

The positive electrode and counterelectrode (for example, metallic lithium) constituting the battery is dipped in an electrolyte solution having the same composition as that used in the battery and perform charging/discharging at normal temperature (25±5° C.) First, the positive electrode is charged at a current density of 0.1 mA/cm$^2$. The potential is raised to 4.9 V (vs. Li/Li$^+$) to charge the battery at constant voltage. The charged capacity value of the positive electrode measured at this time is defined as the capacity of the positive electrode.

B) Capacity of the Negative Electrode

The negative electrode and counterelectrode (for example, metallic lithium) constituting the battery is dipped in an electrolyte solution having the same composition as that used in the battery and perform charging/discharging at normal temperature (25±5° C.) First, the negative electrode is charged at a current density of 0.1 mA/cm$^2$. The potential is dropped to 0.1 V (vs. Li/Li$^+$) to charge the battery at constant voltage. The charged capacity value of the negative electrode measured at this time is defined as the capacity of the negative electrode.

When the capacity of the negative electrode is larger than that of the positive electrode, the overcharge of the negative electrode can be suppressed and therefore, deterioration in cycle performance can be suppressed. On the other hand, when the capacity of the negative electrode is smaller than that of the positive electrode, the negative electrode is put into an overcharge state, leading to an increase in the coating resistance of the negative electrode, resulting in deteriorated cycle performance.

The ratio of the capacity of the negative electrode to that of the positive electrode is preferably in the range from 1.03 to 1.2. When the ratio is 1.03 or more, this can suppress an increase in resistance. When the ratio is 1.2 or less, this can prevent a reduction in capacity retention.

Lithium-nickel-cobalt-manganese complex oxide represented by the formula $Li_{1+a}Ni_{1-b-c}Co_bMn_cO_2$ has a layer structure. Generally, a positive electrode using such a compound as the positive electrode active material does not release all lithium ions contained in the compound when charging the battery. Therefore, the battery can release lithium ions even in an overcharge state.

On the other hand, a negative electrode using LTO and/or TiO$_2$(B) as the negative electrode active material has large overvoltage when the potential is reduced to 1.3 V or less (vs. Li/Li$^+$), bringing about a sharp drop in potential. The drop of the potential progresses the decomposition of the electrolyte solution and thereby forming a coating. As a result, the resistance increases.

Therefore, a battery constituted of a positive electrode using a compound having a layer structure and of a negative electrode using LTO and/or TiO$_2$(B) has the problem that the resistance increases in the end period of charge step, giving rise to the problem concerning deteriorated cycle performance.

In the embodiment, the negative electrode further contains at least one selected from a oxide which has a spinel structure and represented by the formula $AFe_2O_4$ and a oxide which has a spinel structure and represented by the formula $ACo_2O_4$. Also, the capacity of the negative electrode is designed to be larger than the capacity in a chargeable area of the positive electrode.

In the oxide which has a spinel structure and is represented by the formulae $AFe_2O_4$ or $ACo_2O_4$, the insertion of lithium ions occurs at a potential of about 1.0 V (vs. Li/Li$^+$) in the first charging of the battery. Accordingly, lithium ions are inserted into these oxides substituted for LTO and/or TiO$_2$(B) when the potential of the negative electrode is dropped to about 1.0 V (vs. Li/Li$^+$) in the end period of charge step. The potential of the negative electrode is thereby kept about 1.0 V (vs. Li/Li$^+$). This can prevent a sharp rise in the charge voltage of the battery. Further, because the potential of the negative electrode does not drop, the decomposition of the electrolyte solution is suppressed. This prevents a rise in resistance, resulting in improved cycle performance. Further, because the insertion of lithium ions into LTO and TiO$_2$(B) at a voltage as low as 1.0 V (vs. Li/Li$^+$) or less does not occur, the destruction of the crystal structures of LTO and TiO$_2$(B) can be reduced. For this, the deterioration of LTO and TiO$_2$(B) is suppressed. Therefore, the capacity and cycle performance are improved.

Moreover, when the capacity of the negative electrode is designed to be larger than that of the positive electrode, an increase in the coating resistance in the negative electrode can be suppressed.

In the formulae $AFe_2O_4$ and $ACo_2O_4$, A is at least one element selected from the group consisting of Cu, Co, Ca, Mg, Zn, Ni, and Fe. Iron oxide compounds and cobalt oxide compounds containing such an element are compounds in which insertion of lithium ions occur at 1.0 V (vs. Li/Li$^+$). For this, the addition of these compounds to the negative electrode can reduce an increase in the resistance of the negative electrode.

The ratio of the total mass of the oxide represented by the formula $AFe_2O_4$ and the oxide represented by the formula $ACo_2O_4$ to the total mass of the negative electrode active material is in a range from 1% by mass to 5% by mass. When the above ratio is less than 1% by mass, the effect of suppressing the rise of resistance is not obtained. When the above ratio exceeds 5% by mass, on the other hand, the capacity retention is reduced. The ratio is more preferably in a range from 2.5% by mass to 4% by mass.

The oxide having a spinel structure and represented by the formulae $AFe_2O_4$ or $ACo_2O_4$ has a first charge capacity of about 1000 mAh/g. Therefore, containing such an oxide does not decrease the energy density.

According to the embodiment, a nonaqueous electrolyte battery having excellent cycle performance can be provided.

(Second Embodiment)

A battery pack according to a second embodiment will be explained with reference to the drawings. The battery pack comprises one or more of the above nonaqueous electrolyte battery (unit cells) according to the above first embodiment. When the battery pack includes two or more unit cells, these unit cells are disposed in such a manner that they are electrically connected in series or in parallel.

Figure 4:
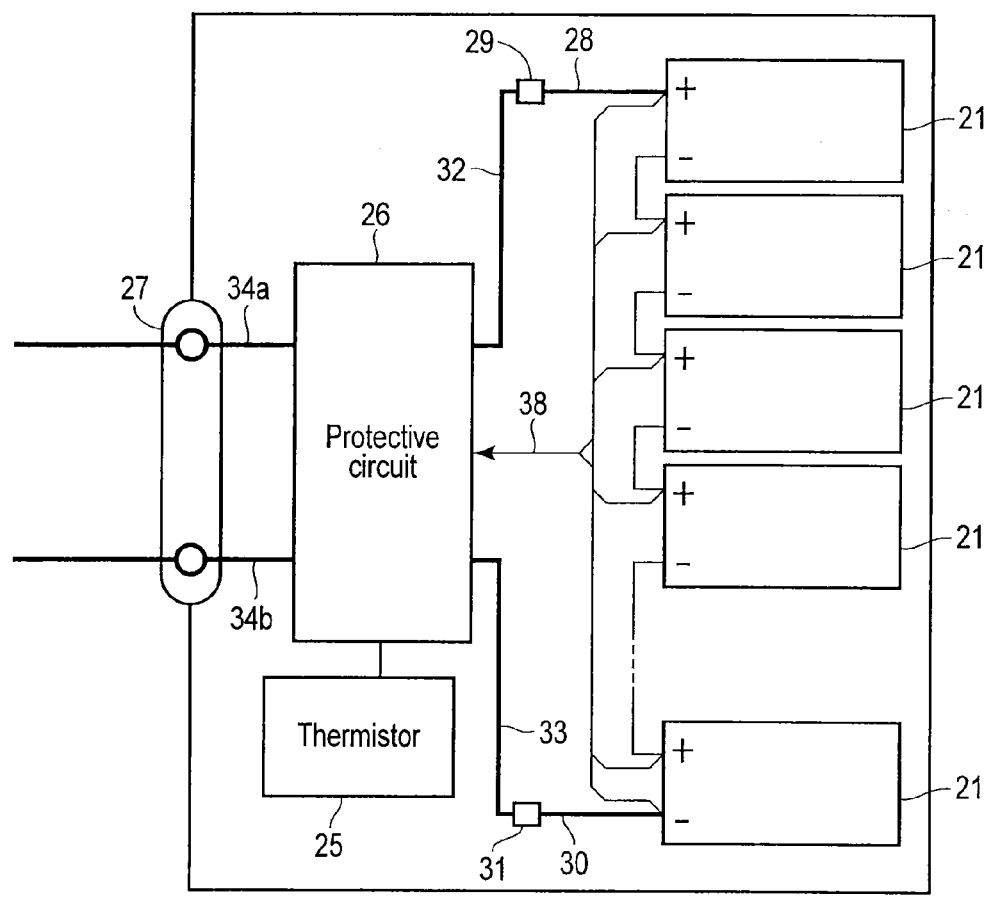
FIG. 4 is a block diagram showing the electric circuit of a battery pack of FIG. 3.

FIGS. 3 and 4 show an example of a battery pack 20. FIG. 3 is an exploded perspective view of the battery pack 20. FIG. 4 is a block diagram showing the electric circuit of the battery pack 20 shown in FIG. 3.

The battery pack 20 includes eight batteries. The battery 1 are laminated in the direction of the thickness and fastened with an adhesive tape 22 to constitute a battery assembly 23. The eight batteries are electrically connected in series as shown in FIG. 4.

The eight batteries are laminated such that externally extended positive electrode terminals 7 and negative electrode terminals 8 are arranged in the same direction. A printed wiring board 24 is disposed opposite to the side surface of the battery assembly 23 from which the positive electrode terminal 7 and negative electrode terminal 8 are extended.

As shown in FIG. 4, a thermistor 25, a protective circuit 26 and an energizing terminal 27 connected to external devices are mounted on the printed wiring board 24. An insulating plate (not shown) is attached to the surface of the printed wiring board 24 facing the battery assembly 23 to avoid unnecessary electrical connection with the wiring of the battery assembly 23. The insulating plate is formed of rubber, resin, or the like.

A positive electrode side lead 28 is connected with the positive electrode terminal 7 positioned on the lowermost layer of the battery assembly 23. The tip of the positive electrode side lead 28 is inserted into a positive electrode side connector 29 of the printed wiring board 24. A negative electrode side lead 30 is connected with the negative electrode terminal 8 positioned on the uppermost layer of the battery assembly 23. The top of the negative electrode side lead 30 is inserted into a negative electrode side connector 31 of the printed wiring board 24. These connectors 29 and 31 are connected to the protective circuit 26 through wirings 32 and 33 formed on the printed wiring board 24.

The thermistor 25 is used to detect the temperature of the battery 1. The detected signals are transmitted to the protective circuit 26. The protective circuit 26 can shuts off a plus side wiring 34a and minus side wiring 34b between the protective circuit 26 and the energizing terminal 27 in a predetermined condition. The predetermined condition means, for example, the case where the temperature detected by the thermistor 25 is above a predetermined one. Further, the predetermined condition means, for example, the case where overcharge, overdischarge or over-current of the battery 1 is detected. The detections of this overcharge and the like are performed for individual battery 1 or whole of the eight batteries. When the individual batteries are detected, either the voltage of the battery may be detected or the potential of the positive electrode or negative electrode may be detected. In the latter case, a lithium electrode used as a reference electrode is inserted between the individual batteries. In the case of FIGS. 3 and 4, a wiring 38 for detecting voltage is connected to each battery 1 and the detected signals are transmitted to the protective circuit 26 through these wirings 38.

A protective sheet 35 made of a rubber or resin is disposed on each of the three side surfaces of the battery assembly 23 excluding the side surface on which the positive electrode terminal 7 and negative electrode terminal 8 are positioned.

The battery assembly 23 is accommodated in a receiving tank 36 together with each protective sheet 35 and the printed wiring board 24. The protective sheet 35 is disposed on each inside surface in the direction of the long side and on one of the inside surfaces in the direction of the short side of the receiving tank 36, and the printed wiring board 24 is disposed on the other inside surface in the direction of the short side. The battery assembly 23 is positioned in a space enclosed by the protective sheets 35 and the printed wiring board 24. A lid 37 is attached to the upper surface of the receiving tank 36.

Here, a thermally contracting tape may be used instead of the adhesive tape 22 to secure the battery assembly 23. In this case, after the protective sheet is disposed on both sides of the battery assembly 23 and the thermally contracting tapes are wound around the battery assembly. The thermally contracting tape is contracted by heating to fasten the battery assembly.

Though the structure in which the batteries are connected in series is shown in FIG. 3 and FIG. 4, these batteries may be connected in parallel to increase the capacity of the battery pack. Alternatively, series-parallel cell connections may be combined. The assembled battery packs may be further connected in series or parallel.

Further, the structure of the battery pack is appropriately changed according to its use. According to this embodiment, a battery pack can be provided which is preferably used in applications for which excellent cycle performance and large-current performance are required. Specifically, a battery pack can be provided which is preferably used for power sources for digital cameras, and power sources mounted on vehicles such as two- to four-wheel hybrid electric cars, two- to four-wheel electric cars or assist bicycles.

According to these embodiments, a battery pack improved in cycle performance can be provided.

EXAMPLES

Examples will be explained. However, these Examples are not intended to limit the scope of the present invention.

Example 1

<Production of a Positive Electrode>

90% by mass of $LiNi_{0.33}Co_{0.33}Mn_{0.33}O_2$, 3% by mass of carbon black, 3% by mass of graphite, and 4% by mass of PVdF were dispersed in N-methyl-2-pyrrolidone (NMP) to prepare a slurry. This slurry was applied to the surface of an aluminum foil, dried, and then rolled to thereby produce an electrode.

<Production of a Negative Electrode>

90% by mass of a mixture of $Li_4Ti_5O_{12}$ and $Fe_3O_4$, 3% by mass of carbon black, 3% by mass of graphite, and 4% by mass of PVdF were dispersed in NMP to prepare a slurry. This slurry was applied to the surface of an aluminum foil, dried, and then rolled to thereby produce an electrode. The ratio by mass of $Li_4Ti_5O_{12}$ to $Fe_3O_4$, was designed to be 96:4.

Further, in the productions of the positive electrode and negative electrode, the capacity of the negative electrode was designed to be larger than that of the positive electrode.

<Production of an Evaluation Cell>

A two-electrode glass cell was produced under the atmosphere of dry argon. The positive electrode and negative electrode were made to face each other through a glass filter (separator) and these members were accommodated in a glass container. The positive electrode and negative electrode are connected to each terminal of the glass cell. $LiPF_6$ was dissolved as the electrolyte in a mixture solvent to prepare an electrolyte solution. The mixture solvent contained propylene carbonate (PC) and diethyl carbonate (DEC) in a ratio by volume of 1:2. The concentration of $LiPF_6$ was 1.0 mol/L. This electrolyte solution was injected in a glass container. The separator and electrodes were impregnated with the electrolyte solution sufficiently and then, the glass container was sealed. An evaluation cell was thus produced.

Example 2

An evaluation cell was produced in the same manner as in Example 1 except that the ratio by mass of $Li_4Ti_5O_{12}$ to $Fe_3O_4$ contained in the negative electrode was changed to 99:1.

Example 3

An evaluation cell was produced in the same manner as in Example 1 except that the ratio by mass of $Li_4Ti_5O_{12}$ to $Fe_3O_4$ contained in the negative electrode was changed to 95:5.

Example 4

An evaluation cell was produced in the same manner as in Example 1 except that $LiNi_{0.5}Co_{0.2}Mn_{0.3}O_2$ was used instead of $LiNi_{0.33}Co_{0.33}Mn_{0.33}O_2$ in the positive electrode.

Example 5

An evaluation cell was produced in the same manner as in Example 1 except that $LiNi_{0.6}Co_{0.2}Mn_{0.2}O_2$ was used instead of $LiNi_{0.33}Co_{0.33}Mn_{0.33}O_2$ in the positive electrode.

Example 6

An evaluation cell was produced in the same manner as in Example 1 except that $LiNi_{0.8}Co_{0.1}Mn_{0.1}O_2$ was used instead of $LiNi_{0.33}Co_{0.33}Mn_{0.33}O_2$ in the positive electrode.

Comparative Example 1

An evaluation cell was produced in the same manner as in Example 1 except that 90% by mass of $Li_4Ti_5O_{12}$ was used instead of 90% by mass of the mixture of $Li_4Ti_5O_{12}$ and $Fe_3O_4$ in the negative electrode.

Comparative Example 2

An evaluation cell was produced in the same manner as in Example 1 except that the ratio by mass of $Li_4Ti_5O_{12}$ to $Fe_3O_4$ contained in the negative electrode was changed to 99.5:0.5.

Comparative Example 3

An evaluation cell was produced in the same manner as in Example 1 except that the ratio by mass of $Li_4Ti_5O_{12}$ to $Fe_3O_4$ contained in the negative electrode was changed to 92:8.

Example 7

An evaluation cell was produced in the same manner as in Example 1 except that 90% by mass of a mixture of $Li_4Ti_5O_{12}$, $TiO_2(B)$, and $Fe_3O_4$ instead of 90% by mass of the mixture of $Li_4Ti_5O_{12}$ and $Fe_3O_4$ in the negative electrode. The ratio by mass of $Li_4Ti_5O_{12}:TiO_2(B):Fe_3O_4$ was 48:48:4.

Example 8

An evaluation cell was produced in the same manner as in Example 1 except that 90% by mass of a mixture of $TiO_2(B)$ and $Fe_3O_4$ instead of 90% by mass of the mixture of $Li_4Ti_5O_{12}$ and $Fe_3O_4$ in the negative electrode. The ratio by mass of $TiO_2(B)$ to $Fe_3O_4$ was 97:3.

Example 9

An evaluation cell was produced in the same manner as in Example 8 except that $LiNi_{0.5}Co_{0.2}Mn_{0.3}O_2$ was used instead of $LiNi_{0.33}Co_{0.33}Mn_{0.33}O_2$ in the positive electrode.

Example 10

An evaluation cell was produced in the same manner as in Example 8 except that $LiNi_{0.8}Co_{0.1}Mn_{0.1}O_2$ was used instead of $LiNi_{0.33}Co_{0.33}Mn_{0.33}O_2$ in the positive electrode.

Example 11

An evaluation cell was produced in the same manner as in Example 1 except that 90% by mass of a mixture of $TiO_2(B)$ and $ZnFe_2O_4$ was used instead of 90% by mass of a mixture of $Li_4Ti_5O_{12}$ and $Fe_3O_4$ in the negative electrode. The ratio by mass of $TiO_2(B)$ to $ZnFe_2O_4$ was 97:3.

Example 12

An evaluation cell was produced in the same manner as in Example 1 except that 90% by mass of a mixture of $TiO_2(B)$ and $CO_3O_4$ was used instead of 90% by mass of a mixture of $Li_4Ti_5O_{12}$ and $Fe_3O_4$ in the negative electrode. The ratio by mass of $TiO_2(B)$ to $Co_3O_4$ was 97:3.

Example 13

An evaluation cell was produced in the same manner as in Example 1 except that 90% by mass of a mixture of $TiO_2(B)$ and $ZnCo_2O_4$ was used instead of 90% by mass of a mixture of $Li_4Ti_5O_{12}$ and $Fe_3O_4$ in the negative electrode. The ratio by mass of $TiO_2(B)$ to $ZnCo_2O_4$ was 97:3.

Example 14

An evaluation cell was produced in the same manner as in Example 1 except that 90% by mass of a mixture of $TiO_2(B)$ and $CuCo_2O_4$ was used instead of 90% by mass of a mixture of $Li_4Ti_5O_{12}$ and $Fe_3O_4$ in the negative electrode. The ratio by mass of $TiO_2(B)$ to $CuCo_2O_4$ was 97:3.

Example 15

An evaluation cell was produced in the same manner as in Example 1 except that 90% by mass of a mixture of $TiO_2(B)$ and $NiCo_2O_4$ was used instead of 90% by mass of a mixture of $Li_4Ti_5O_{12}$ and $Fe_3O_4$ in the negative electrode. The ratio by mass of $TiO_2(B)$ to $NiCo_2O_4$ was 97:3.

Comparative Example 4

An evaluation cell was produced in the same manner as in Example 1 except that 90% by mass of a mixture of $TiO_2(B)$ and $ZnCo_2O_4$ was used instead of 90% by mass of a mixture of $Li_4Ti_5O_{12}$ and $Fe_3O_4$ in the negative electrode. The ratio by mass of $TiO_2(B)$ to $ZnCo_2O_4$ was 99.5:0.5.

Comparative Example 5

An evaluation cell was produced in the same manner as in Example 1 except that 90% by mass of a mixture of $TiO_2(B)$ and $ZnCo_2O_4$ was used instead of 90% by mass of a mixture of $Li_4Ti_5O_{12}$ and $Fe_3O_4$ in the negative electrode. The ratio by mass of $TiO_2(B)$ to $ZnCo_2O_4$ was 93:7.

(Charge/Discharge Test)

The charge/discharge test was performed by using each evaluation cell according to Examples 1 to 15 and Comparative Examples 1 to 5 under the environment of 25° C. The test was performed at a discharge rate of 1 C in a voltage range from 1.0 to 3.5 V. In one cycle, one charge/discharge operation was carried out and 30 cycles were repeated in the test. Each of the capacity after the first charge/discharge and after 30 cycles was measured. The first capacity was set to 100% to calculate capacity retention (%) after 30 cycles. The results are shown in Table 1.

The results of Examples 4 to 6 and 9 to 10 showed that the capacity retention was improved even in the case of using a positive electrode active material containing a relatively large amount of Ni.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising
a positive electrode comprising a positive electrode current collector and a positive electrode layer provided on the positive electrode current collector;
a negative electrode comprising a negative electrode current collector and a negative electrode layer provided on the negative electrode current collector; and
a nonaqueous electrolyte, wherein
the positive electrode layer contains a positive electrode active material, the positive electrode active material containing a lithium-nickel-cobalt-manganese complex oxide represented by the formula $Li_{1+a}Ni_{1-b-c}Co_b$-$Mn_cO_2$, where a, b, and c satisfy a relationship represented by a inequality $0 \leq a \leq 0.2$, $0 < b \leq 0.4$, and $0 < c \leq 0.4$, respectively;
the negative electrode layer contains a negative electrode active material, the negative electrode active material containing
at least one selected from a lithium titanate having a spinel structure and a monoclinic β-type titanium complex oxide, and
at least one selected from a oxide which has a spinel structure and represented by the formula $AFe_2O_4$ and a oxide

TABLE 1

| | Positive electrode active material | Negative electrode active material | | Ratio of $AFe_2O_4/ACo_2O_4$ (mass %) | Capacity retention (%) |
|---|---|---|---|---|---|
| Example 1 | $LiNi_{0.33}Co_{0.33}Mn_{0.33}O_2$ | $Li_4Ti_5O_{12}$ | $Fe_3O_4$ | 4 | 90 |
| Example 2 | $LiNi_{0.33}Co_{0.33}Mn_{0.33}O_2$ | $Li_4Ti_5O_{12}$ | $Fe_3O_4$ | 1 | 86 |
| Example 3 | $LiNi_{0.33}Co_{0.33}Mn_{0.33}O_2$ | $Li_4Ti_5O_{12}$ | $Fe_3O_4$ | 5 | 90 |
| Example 4 | $LiNi_{0.5}Co_{0.2}Mn_{0.3}O_2$ | $Li_4Ti_5O_{12}$ | $Fe_3O_4$ | 4 | 88 |
| Example 5 | $LiNi_{0.6}Co_{0.2}Mn_{0.2}O_2$ | $Li_4Ti_5O_{12}$ | $Fe_3O_4$ | 4 | 85 |
| Example 6 | $LiNi_{0.8}Co_{0.1}Mn_{0.1}O_2$ | $Li_4Ti_5O_{12}$ | $Fe_3O_4$ | 4 | 83 |
| Comparative Example 1 | $LiNi_{0.33}Co_{0.33}Mn_{0.33}O_2$ | $Li_4Ti_5O_{12}$ | — | 0 | 79 |
| Comparative Example 2 | $LiNi_{0.33}Co_{0.33}Mn_{0.33}O_2$ | $Li_4Ti_5O_{12}$ | $Fe_3O_4$ | 0.5 | 79 |
| Comparative Example 3 | $LiNi_{0.33}Co_{0.33}Mn_{0.33}O_2$ | $Li_4Ti_5O_{12}$ | $Fe_3O_4$ | 8 | 82 |
| Example 7 | $LiNi_{0.33}Co_{0.33}Mn_{0.33}O_2$ | $Li_4Ti_5O_{12} + TiO_2(B)$ | $Fe_3O_4$ | 4 | 87 |
| Example 8 | $LiNi_{0.33}Co_{0.33}Mn_{0.33}O_2$ | $TiO_2(B)$ | $Fe_3O_4$ | 3 | 85 |
| Example 9 | $LiNi_{0.5}Co_{0.2}Mn_{0.3}O_2$ | $TiO_2(B)$ | $Fe_3O_4$ | 3 | 82 |
| Example 10 | $LiNi_{0.8}Co_{0.1}Mn_{0.1}O_2$ | $TiO_2(B)$ | $Fe_3O_4$ | 3 | 80 |
| Example 11 | $LiNi_{0.33}Co_{0.33}Mn_{0.33}O_2$ | $TiO_2(B)$ | $ZnFe_2O_4$ | 3 | 86 |
| Example 12 | $LiNi_{0.33}Co_{0.33}Mn_{0.33}O_2$ | $TiO_2(B)$ | $Co_3O_4$ | 3 | 86 |
| Example 13 | $LiNi_{0.33}Co_{0.33}Mn_{0.33}O_2$ | $TiO_2(B)$ | $ZnCo_2O_4$ | 3 | 85 |
| Example 14 | $LiNi_{0.33}Co_{0.33}Mn_{0.33}O_2$ | $TiO_2(B)$ | $CuCo_2O_4$ | 3 | 83 |
| Example 15 | $LiNi_{0.33}Co_{0.33}Mn_{0.33}O_2$ | $TiO_2(B)$ | $NiCo_2O_4$ | 3 | 83 |
| Comparative Example 4 | $LiNi_{0.33}Co_{0.33}Mn_{0.33}O_2$ | $TiO_2(B)$ | $ZnCo_2O_4$ | 0.5 | 75 |
| Comparative Example 5 | $LiNi_{0.33}Co_{0.33}Mn_{0.33}O_2$ | $TiO_2(B)$ | $ZnCo_2O_4$ | 7 | 79 |

All of the evaluation cells according to Examples 1 to 6 each had higher capacity retention than each evaluation cell according to Comparative Examples 1 to 3. Further, all of the evaluation cells according to Examples 7 to 15 each had higher capacity retention than each evaluation cell according to Comparative Examples 4 and 5. It was therefore shown that when the oxide represented by the formula $AFe_2O_4$ or $ACo_2O_4$ contained in the negative electrode active material was in a range of 1% by mass to 5% by mass of the total mass of the negative electrode active material, the capacity retention was improved.

which has a spinel structure and represented by the formula $ACo_2O_4$, where A is at least one element selected from the group consisting of Cu, Co, Ca, Mg, Zn, Ni, and Fe;

a ratio of the total mass of the oxide represented by the formula $AFe_2O_4$ and the oxide represented by the formula $ACo_2O_4$ to the total mass of the negative electrode active material is in a range from 1% by mass to 5% by mass; and a capacity of the negative electrode is larger than that of the positive electrode.

2. The battery according to claim 1, wherein the oxide represented by the formula $AFe_2O_4$ is at least one compound selected from $Fe_3O_4$ and $ZnFe_2O_4$.

3. The battery according to claim 2, wherein the negative electrode active material contains only a lithium titanate having a spinel structure among a lithium titanate having a spinel structure and a monoclinic β-type titanium complex oxide.

4. The battery according to claim 3, wherein the positive electrode layer further contains a lithium-manganese complex oxide having a spinel structure.

5. The battery according to claim 2, wherein the positive electrode layer further contains a lithium-manganese complex oxide having a spinel structure.

6. A battery pack comprising
the nonaqueous electrolyte battery according to claim 2; and
a container accommodating the battery.

7. The battery according to claim 1, wherein the oxide represented by the formula $ACo_2O_4$ is at least one compound selected from the group consisting of $Co_3O_4$, $ZnCo_2O_4$, $CuCo_2O_4$, and $NiCo_2O_4$.

8. The battery according to claim 7, wherein the negative electrode active material contains only a lithium titanate having a spinel structure among a lithium titanate having a spinel structure and a monoclinic β-type titanium complex oxide.

9. The battery according to claim 8, wherein the positive electrode layer further contains a lithium-manganese complex oxide having a spinel structure.

10. The battery according to claim 7, wherein the positive electrode layer further contains a lithium-manganese complex oxide having a spinel structure.

11. A battery pack comprising
the nonaqueous electrolyte battery according to claim 7; and
a container accommodating the battery.

12. The battery according to claim 1, wherein the oxide represented by the formula $AFe_2O_4$ is at least one compound selected from $Fe_3O_4$ and $ZnFe_2O_4$; and
the oxide represented by the formula $ACo_2O_4$ is at least one compound selected from the group consisting of $Co_3O_4$, $ZnCo_2O_4$, $CuCo_2O_4$, and $NiCo_2O_4$.

13. The battery according to claim 12, wherein the negative electrode active material contains only a lithium titanate having a spinel structure among a lithium titanate having a spinel structure and a monoclinic β-type titanium complex oxide.

14. The battery according to claim 13, wherein the positive electrode layer further contains a lithium-manganese complex oxide having a spinel structure.

15. The battery according to claim 12, wherein the positive electrode layer further contains a lithium-manganese complex oxide having a spinel structure.

16. A battery pack comprising
the nonaqueous electrolyte battery according to claim 12; and
a container accommodating the battery.

17. The battery according to claim 1, wherein the negative electrode active material contains only a lithium titanate having a spinel structure among a lithium titanate having a spinel structure and a monoclinic β-type titanium complex oxide.

18. The battery according to claim 17, wherein the positive electrode layer further contains a lithium-manganese complex oxide having a spinel structure.

19. The battery according to claim 1, wherein the positive electrode layer further contains a lithium-manganese complex oxide having a spinel structure.

20. A battery pack comprising
the nonaqueous electrolyte battery according to claim 1; and
a container accommodating the battery.

* * * * *